United States Patent
Hocke et al.

(10) Patent No.: US 10,614,643 B2
(45) Date of Patent: Apr. 7, 2020

(54) AUTHORIZING THE USE OF A MOTOR VEHICLE

(71) Applicant: Bayerische Motoren Werke Aktiengesellschaft, Munich (DE)

(72) Inventors: Fredrik Hocke, Munich (DE); Ralf Wistorf, Munich (DE); Stefan Heinbockel, Munich (DE); Helmut Wagatha, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/138,411

(22) Filed: Sep. 21, 2018

(65) Prior Publication Data

US 2019/0026967 A1    Jan. 24, 2019

Related U.S. Application Data

(63) Continuation of application No. PCT/EP2016/075335, filed on Oct. 21, 2016.

(30) Foreign Application Priority Data

Mar. 22, 2016  (DE) .................. 10 2016 204 749

(51) Int. Cl.
  *B60R 25/24* (2013.01)
  *G07C 9/00* (2020.01)
  *G01S 11/04* (2006.01)

(52) U.S. Cl.
  CPC .......... *G07C 9/00309* (2013.01); *B60R 25/24* (2013.01); *B60R 25/241* (2013.01);
  (Continued)

(58) Field of Classification Search
  None
  See application file for complete search history.

(56) References Cited

U.S. PATENT DOCUMENTS

| 3,826,868 A | * | 7/1974 | Nugent | G08B 29/00 370/215 |
| 4,539,710 A | * | 9/1985 | Dinsmore | H04B 7/082 340/870.41 |

(Continued)

FOREIGN PATENT DOCUMENTS

DE         197 12 911 A1    10/1998
DE    10 2005 013 910 B3     9/2006
(Continued)

OTHER PUBLICATIONS

PCT/EP2016/075335, International Search Report dated Jan. 13, 2017 (Three (3) pages).
(Continued)

*Primary Examiner* — K. Wong
(74) *Attorney, Agent, or Firm* — Crowell & Moring LLP

(57) ABSTRACT

A method for authorizing the use of a motor vehicle having a first and second antenna spatially remote from one another, includes emitting, from the first vehicle antenna, a first signal that is received by an identification transmitter antenna of a portable identification transmitter. The method also includes establishing at least one spatial component of a first electromagnetic field of the received first signal using an angle-resolving magnetic field sensor, emitting, by the second vehicle antenna, a second signal that is received by the portable identification transmitter antenna, and establishing at least one spatial component of the second electromagnetic field of the received second signal using the angle-resolving magnetic field sensor. The method also includes establishing an angle at least between the established at least one spatial component of the first electromagnetic field and the established at least one spatial component of the second electromagnetic field, and providing a first authorization signal for authorizing the use of the motor
(Continued)

vehicle when the established angle exceeds a predetermined threshold value.

18 Claims, 1 Drawing Sheet

(52) U.S. Cl.
CPC .......... *B60R 25/245* (2013.01); *B60R 25/246* (2013.01); *G01S 11/04* (2013.01); *G07C 2009/00325* (2013.01); *G07C 2009/00555* (2013.01)

(56) References Cited

U.S. PATENT DOCUMENTS

| | | | | |
|---|---|---|---|---|
| 5,377,222 | A * | 12/1994 | Sanderford, Jr. | H04B 1/713 342/18 |
| 5,661,470 | A * | 8/1997 | Karr | G06K 7/086 340/10.33 |
| 5,940,003 | A | 8/1999 | Schulz | |
| 6,208,239 | B1 * | 3/2001 | Muller | B60R 25/24 340/10.1 |
| 6,538,560 | B1 * | 3/2003 | Stobbe | B29C 44/56 340/5.72 |
| 6,937,136 | B2 * | 8/2005 | Greenwood | B60R 25/246 340/5.61 |
| 6,965,296 | B2 * | 11/2005 | Kamlah | B60R 25/00 340/10.41 |
| 7,705,710 | B2 * | 4/2010 | Hermann | B60R 25/24 340/426.11 |
| RE41,843 | E * | 10/2010 | Blatz | G06K 19/0723 324/207.17 |
| 9,741,232 | B2 * | 8/2017 | Ueki | B60R 25/245 |
| 2013/0063247 | A1 | 3/2013 | Blatz | |
| 2018/0290625 | A1 * | 10/2018 | Wagatha | B60R 25/24 |
| 2019/0016304 | A1 * | 1/2019 | Hocke | B60R 25/24 |
| 2019/0023225 | A1 * | 1/2019 | Heinbockel | G07C 9/00119 |

FOREIGN PATENT DOCUMENTS

| | | |
|---|---|---|
| DE | 10 2010 010 057 A1 | 9/2011 |
| DE | 10 2011 079 421 A1 | 1/2013 |
| DE | 10 2012 218 149 A1 | 6/2014 |
| EP | 0 867 971 A2 | 9/1998 |
| EP | 1 184 236 A2 | 3/2002 |
| EP | 1 403 653 A1 | 3/2004 |
| EP | 2 498 226 A2 | 9/2012 |
| WO | WO 2009/143415 A1 | 11/2009 |
| WO | WO 2015/084852 A1 | 6/2015 |

OTHER PUBLICATIONS

German Search Report issued in German counterpart application No. 10 2016 204 749.3 dated Sep. 22, 2016, with Statement of Relevancy (Twelve (12) pages).

* cited by examiner

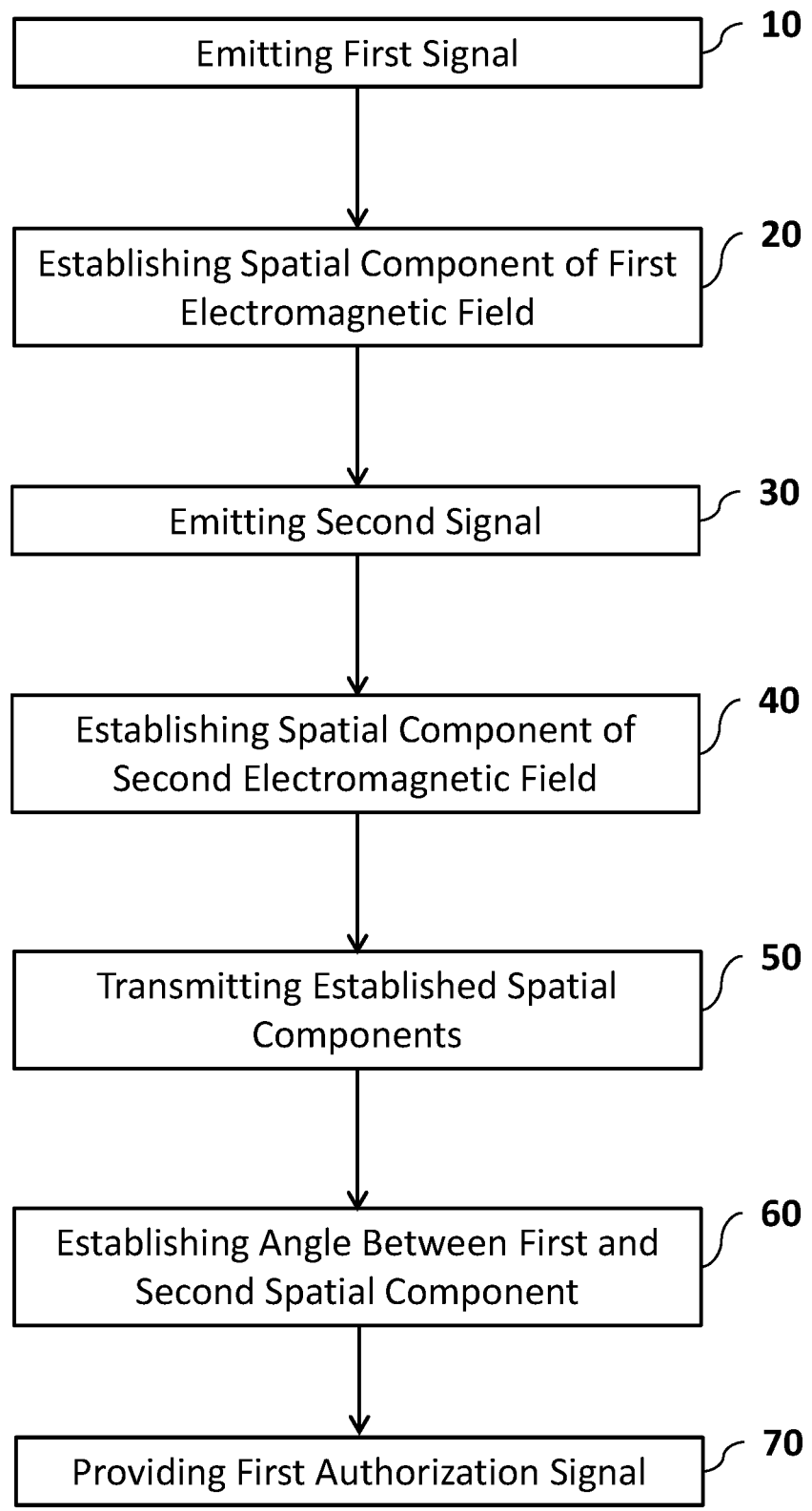

AUTHORIZING THE USE OF A MOTOR VEHICLE

CROSS REFERENCE TO RELATED APPLICATIONS

This application is a continuation of PCT International Application No. PCT/EP2016/075335, filed Oct. 21, 2016, which claims priority under 35 U.S.C. § 119 from German Patent Application No. 10 2016 204 749.3, filed Mar. 22, 2016, the entire disclosures of which are herein expressly incorporated by reference.

This application contains subject matter related to U.S. application Ser. No. 16/138,350, entitled "Authorizing the Use of a Motor Vehicle" and Ser. No. 16/138,436, also entitled "Authorizing the Use of a Motor Vehicle," both of which are filed on even date herewith.

BACKGROUND AND SUMMARY OF THE INVENTION

The invention relates in particular to a method for authorizing the use of a motor vehicle which has at least one first and one second antenna, wherein the first antenna and the second antenna are spatially remote from one another. The motor vehicle is in particular a two-wheeled or four-wheeled motor vehicle.

In such known methods, it is desirable to further improve same against manipulations.

An object of the invention is in particular to provide a method for authorizing the use of a motor vehicle having improved protection against manipulations.

This object is achieved in particular by a method for authorizing the use of a motor vehicle having the features of the independent method claim. Advantageous refinements of the method according to the invention are the subject of the dependent method claims.

The method according to the invention is based on a method for authorizing the use of a motor vehicle, in particular a two-wheeled or four-wheeled motor vehicle, which has at least one first and one second antenna, wherein the first antenna and the second antenna are spatially remote from one another, by way of a portable identification transmitter that has an identification transmitter antenna.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows embodiment of a method in accordance with the principles of the invention.

DETAILED DESCRIPTION OF THE DRAWINGS

Referring to FIG. 1, in a first step 10, the first vehicle antenna emits a first signal that is received by the identification transmitter antenna.

In a second step 20, the identification transmitter establishes at least one of the spatial components of the first electromagnetic field of the received first signal, preferably using an angle-resolving magnetic field sensor.

In a third step 30, the second vehicle antenna emits a second signal that is received by the identification transmitter antenna.

In a fourth step 40, the identification transmitter establishes at least one of the spatial components of the second electromagnetic field of the received second signal, preferably using the angle-resolving magnetic field sensor.

In a fifth step 50, the identification transmitter transmits the established at least one spatial component of the first electromagnetic field of the received first signal and the established at least one spatial component of the second electromagnetic field of the received second signal or first corresponding data to the vehicle.

In a sixth step 60, a first computer, preferably a computer in the motor vehicle, establishes the angle at least between the established spatial component of the first electromagnetic field of the received first signal and the established spatial component of the second electromagnetic field of the received second signal, and in a seventh step 70, the motor vehicle provides an authorization signal for authorizing the use of the motor vehicle only when the established angle exceeds a predetermined threshold value.

In summary, the method according to the invention, with the aid of at least two spatially separate or remote transmitters, may be used to determine the position of the receiver or of the identification transmitter in an angle-resolved manner. If the signals of the remote transmitters are forwarded by a repeater for manipulative purposes, the propagation time is increased and the angle information is lost. The angle-resolving method according to the invention is able to recognize such manipulation of the transmission path by recognizing the parallelism of the signals from the identification transmitter and/or from the motor vehicle and said identification transmitter and/or said motor vehicle prevents the emission of an authorization signal.

In one particularly preferred refinement of the method according to the invention, it is provided that, the identification transmitter is provided with a motion sensor. The motion sensor preferably establishes whether it or whether the identification transmitter is being moved, and the identification transmitter transmits the first and/or a second authorization signal for authorizing the use of the motor vehicle to the motor vehicle only when the motion sensor establishes a movement of the identification transmitter. The first corresponding data may constitute the second authorization signal or correspond thereto.

According to one preferred development of the method according to the invention, it is provided that the motion sensor repeatedly establishes whether it is being moved. When a movement is recognized or established, the motion sensor in each case preferably provides the occurrence of the movement and/or the type of the movement with a timestamp.

By way of the above optional measures according to the invention, manipulations are additionally made more difficult or avoided.

In one preferred embodiment of the method according to the invention, it is provided that in each case the occurrence of the movement provided with a timestamp and/or the respective type of the movement provided with a timestamp are stored in a data store in the identification transmitter and/or in a data store in the motor vehicle and retained for a subsequent movement pattern comparison with a reference movement pattern.

As an alternative or in addition, in one embodiment of the method according to the invention, it is provided that the movement pattern comparison is performed by a computer in the identification transmitter and/or by a computer in the motor vehicle, and the identification transmitter and/or the motor vehicle provides an authorization signal for authorizing the use of the motor vehicle only when the computer in the identification transmitter and/or the computer in the motor vehicle establishes a predetermined match level between the movement pattern of the identification transmitter and the reference movement pattern.

In one particularly preferred refinement of the method according to the invention, it is provided that the identification transmitter emits data, such as an authorization signal, only when it is currently being moved.

Furthermore, in one particularly preferred embodiment of the method according to the invention, it is provided that the reference movement pattern is the movement pattern of a typical approach to the vehicle.

In one refinement of the method according to the invention, the reference movement pattern is collected for each authorized party and/or for each identification transmitter and stored in the identification transmitter and/or in the associated motor vehicle for a subsequent movement pattern comparison.

According to one preferred embodiment of the method according to the invention, it is provided that the motion sensor is formed by an acceleration sensor.

The above optional measures according to the invention are suitable for making manipulations even more difficult or for avoiding them.

As an alternative or in addition, in one refinement of the method according to the invention, it may be provided that the time difference between the emission of the first signal by the first vehicle antenna and the emission of the second signal by the second vehicle antenna is selected to be so short in time—but other than zero—that the identification transmitter carried by the driver is substantially not moved as the driver approaches the vehicle. As a result, the establishment of the angle at least between the established spatial component of the first electromagnetic field of the received first signal and the established spatial component of the second electromagnetic field of the received second signal is substantially not falsified or not unusable as a result of the movement of the driver or as a result of the movement, connected therewith, of the identification transmitter.

In one development of the method according to the invention, it is provided that the motor vehicle has a further third antenna that is spatially remote from the first and the second antenna, respectively, and that, in the same way, the angle at least between the established spatial component of the first electromagnetic field of the received first signal and the established spatial component of the third electromagnetic field of a third signal emitted by the third antenna and received by the identification transmitter is determined.

These optional measures too are advantageously suitable for further reducing the risk of manipulations or making them considerably more difficult.

According to one embodiment of the method according to the invention, it is provided that the spatial components, established by the identification transmitter, of the first electromagnetic field of the received first signal are the x, y and z components of the electromagnetic field of a first Cartesian coordinate system.

In one refinement of the method according to the invention, it is provided that the spatial components, established by the identification transmitter, of the second electromagnetic field of the received second signal, the x, y and z components of the electromagnetic field are substantially the components with reference to the first Cartesian coordinate system, substantially because the Cartesian coordinate system or reference system underlying the establishment of the components changes spatially only slightly upon slight movements of the identification transmitter in very short time periods between the repeated establishment of the angles.

According to one development of the method according to the invention, it is provided that the spatial components, established by the identification transmitter, of the third electromagnetic field of the received third signal, the x, y and z components of the electromagnetic field are substantially those of the first Cartesian coordinate system.

In one preferred embodiment of the method according to the invention, it is provided that at least one first vector from the x, y and z components, established by the identification transmitter, of the first electromagnetic field of the received first signal and one second vector from the x, y and z components, established by the identification transmitter, of the second electromagnetic field of the received second signal is formed computationally, and their scalar product is formed computationally from these two vectors.

In one likewise preferred development of the method according to the invention, it is provided that the angle between the two vectors is determined computationally with the aid of the scalar product.

The above optional measures are advantageously suitable for implementing the method according to the invention in a cost-effective manner.

In one preferred embodiment of the method according to the invention, it is provided that the established angle exceeds a predetermined threshold value of substantially zero degrees, in particular a threshold value greater than 1 to 10 degrees, preferably 1 to 5 degrees.

According to one preferred development of the method according to the invention, it is provided that the threshold value, which is greater than zero degrees, is increased as the distance of the identification transmitter from the vehicle decreases, wherein the distance is preferably determined via a propagation time measurement between the signals that are exchanged between vehicle and identification transmitter.

In one preferred embodiment of the method according to the invention, it is provided that the first, second and third antenna each transmit on an identical or different frequency in the frequency range of 20 kHz to 140 kHz, preferably on about 125 kHz, preferably in a temporally offset manner.

By way of these above optional measures, the method according to the invention may be configured to be even more secure.

The invention advantageously makes it possible to provide a vehicle access system for authorizing the use of a motor vehicle, in which the vehicle access system brings about the execution of at least one step of a method according to the invention.

The invention further makes it possible to provide a vehicle access system according to the invention for authorizing the use of a motor vehicle, in which the vehicle access system executes or brings about the execution of at least one step of a method as claimed in one of the preceding claims and the identification transmitter is a radio key or a smartphone, preferably having an identification transmitter software application, such as what is known as an app.

The invention further proposes a vehicle access system according to the invention for authorizing the use of a motor vehicle, in which the identification transmitter is a smartphone provided with a computer chip, a radio vehicle key provided with a computer chip or a chip card having a computer chip.

The invention further proposes a vehicle access system according to the invention for authorizing the use of a motor vehicle, in which the identification transmitter has a sensor for determining or establishing an electromagnetic field and/or the components of the electromagnetic field that has been produced by one or more vehicle antennae in the region of the identification transmitter.

The invention proposes an immobilizer for authorizing the use of a motor vehicle, which immobilizer brings about the execution of at least one step of a method according to the invention.

The invention likewise proposes a motor vehicle that brings about the execution of at least one step of a method according to the invention or is involved in the execution.

Lastly, a computer program product for controlling at least one processor that brings about the performance of at least one step of a method according to the invention is proposed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for authorizing the use of a motor vehicle having at least one first and one second antenna, wherein the first antenna and the second antenna are spatially remote from one another, the method comprising the acts of:
    emitting, from the first vehicle antenna, a first signal that is received by an identification transmitter antenna of a portable identification transmitter, wherein the portable identification transmitter comprises a motion sensor configured to establish whether the portable identification transmitter is moving;
    establishing, by the portable identification transmitter, at least one spatial component of a first electromagnetic field of the received first signal using an angle-resolving magnetic field sensor;
    emitting, by the second vehicle antenna, a second signal that is received by the portable identification transmitter antenna;
    establishing, by the portable identification transmitter, at least one spatial component of the second electromagnetic field of the received second signal using the angle-resolving magnetic field sensor;
    transmitting, by the potable identification transmitter to the motor vehicle, the established at least one spatial component of the first electromagnetic field and the established at least one spatial component of the second electromagnetic field;
    establishing, by a computer in the vehicle, an angle at least between the established at least one spatial component of the first electromagnetic field and the established at least one spatial component of the second electromagnetic field;
    providing, by the motor vehicle, a first authorization signal for authorizing the use of the motor vehicle only when the established angle exceeds a predetermined threshold value; and
    transmitting, by the portable identification transmitter, a second authorization signal to the motor vehicle for authorizing the use of the motor vehicle only when the motion sensor establishes a movement of the portable identification transmitter.

2. The method as claimed in claim 1, wherein the motion sensor repeatedly establishes whether the motion sensor is being moved and, when a movement is recognized or established, the motion sensor in each case provides an occurrence of the movement and/or type of the movement with a timestamp.

3. The method as claimed in claim 2, wherein in each case the occurrence of the movement and/or type of movement provided with a timestamp are stored in a data store and retained for a subsequent movement pattern comparison with a reference movement pattern.

4. The method as claimed in claim 3, wherein the subsequent movement pattern comparison with the reference movement pattern is performed by a computer in one of the portable identification transmitter and in the motor vehicle, and wherein one or both of the portable identification transmitter and the motor vehicle provide a further authorization signal for authorizing the use of the motor vehicle only when a predetermined match level is established between the subsequent movement pattern and the reference movement pattern.

5. The method as claimed in claim 3, wherein the reference movement pattern is a movement pattern of a typical approach to the motor vehicle.

6. The method as claimed in claim 3, wherein the reference movement pattern is collected for each authorized user and/or for each portable identification transmitter and stored in the portable identification transmitter and/or in the motor vehicle.

7. The method as claimed in claim 1, wherein a time difference between emitting the first signal by the first vehicle antenna and emitting the second signal by the second vehicle antenna is selected to be short in time such that the portable identification transmitter carried by a driver of the motor vehicle is substantially not moved as the driver approaches the vehicle, and therefore said establishing the angle is substantially not unusable due to movement of the driver or due to movement of the portable identification transmitter.

8. The method as claimed in claim 1, wherein the motor vehicle has a third antenna that is spatially remote from the first and the second antenna, respectively, and wherein the method further comprises determining an angle at least between the established spatial component of the first electromagnetic field and an established spatial component of the third electromagnetic field of a third signal emitted by the third antenna and received by the portable identification transmitter.

9. The method as claimed in claim 1, wherein the at least one spatial component of the first electromagnetic field of the received first signal include x-, y- and z-components of an electromagnetic field of a first Cartesian coordinate system.

10. The method as claimed in claim 9, wherein the at least one spatial component of the second electromagnetic field of the received second signal are the x-, y- and z-components of an electromagnetic field substantially the components with respect to the first Cartesian coordinate system.

11. The method as claimed in claim 8, wherein the at least one spatial component of the third electromagnetic field of the received third signal are the x-, y- and z-components of an electromagnetic field substantially those of the first Cartesian coordinate system.

12. The method as claimed in claim 1, further comprising:
    computing a first vector from the x-, y- and z-components of the first electromagnetic field of the received first signal;
    computing a second vector of the x-, y- and z-components of the second electromagnetic field of the received second signal; and computing a scalar product from the first vector and the second vector.

13. The method as claimed in claim 12, further comprising computing an angle between the two vectors based on the scalar product.

14. The method as claimed in claim 1, wherein the threshold value increased as a distance of the portable identification transmitter from the motor vehicle decreases, and wherein the distance is determined via a propagation time measurement between signals exchanged between vehicle and portable identification transmitter.

15. The method as claimed in claim 1, wherein the first, second and third antennas transmit with a time offset in a frequency range of 20 kHz to 140 kHz.

16. The method as claimed in claim 4, wherein the further authorization signal is the second signal.

17. A vehicle access system configured to authorize use of a motor vehicle, wherein the system comprises at least one first vehicle antenna and one second vehicle antenna, wherein the first vehicle antenna and the second vehicle antenna are located at a spatial distance from one another, and wherein the system is configured to:
  emit, from the first vehicle antenna, a first signal that is received by an identification transmitter antenna of a portable identification transmitter, wherein the portable identification transmitter comprises a motion sensor configured to establish whether the portable identification transmitter is moving;
  establish, by the portable identification transmitter, at least one spatial component of a first electromagnetic field of the received first signal using an angle-resolving magnetic field sensor;
  emit, by the second vehicle antenna, a second signal that is received by the portable identification transmitter antenna;
  establish, by the portable identification transmitter, at least one spatial component of the second electromagnetic field of the received second signal using the angle-resolving magnetic field sensor;
  transmit, by the potable identification transmitter to the motor vehicle, the established at least one spatial component of the first electromagnetic field and the established at least one spatial component of the second electromagnetic field;
  establish, by a computer in the vehicle, an angle at least between the established at least one spatial component of the first electromagnetic field and the established at least one spatial component of the second electromagnetic field;
  provide, by the motor vehicle, a first authorization signal for authorizing the use of the motor vehicle only when the established angle exceeds a predetermined threshold value; and
  transmit, by the portable identification transmitter, a second authorization signal to the motor vehicle for authorizing the use of the motor vehicle only when the motion sensor establishes a movement of the portable identification transmitter.

18. The vehicle access system as claim in claim 17, wherein the portable identification provider is one of a radio key, a smart phone or a chip card having a computer chip.

* * * * *